United States Patent [19]

Shih et al.

[11] Patent Number: 5,430,340
[45] Date of Patent: Jul. 4, 1995

[54] HARMONIC CURRENT PATH SPRING DEVICE BETWEEN RETAINING RING AND ROTOR WEDGE OF A DYNAMOELECTRIC GENERATOR

[75] Inventors: True T. Shih; James B. Archibald, both of Schenectady; James F. Hopeck, Saratoga; Thomas B. Jenkins, Schenectady, all of N.Y.

[73] Assignee: General Electric Co., Schenectady, N.Y.

[21] Appl. No.: 46,974

[22] Filed: Apr. 15, 1993

[51] Int. Cl.6 .................................. H02K 3/48
[52] U.S. Cl. ........................ 310/214; 310/42; 310/270
[58] Field of Search ........... 310/214, 260, 270, 42, 310/261, 91, 215

[56] References Cited

U.S. PATENT DOCUMENTS

| | | |
|---|---|---|
| 2,773,210 | 12/1956 | Vogt . |
| 2,922,058 | 1/1960 | Bacon ............................ 310/214 |
| 2,960,360 | 11/1960 | Taylor . |
| 3,324,324 | 6/1967 | Richardson et al. . |
| 3,408,516 | 10/1968 | Kudlacik ...................... 310/214 |
| 3,453,587 | 7/1969 | Neidecker . |
| 3,476,966 | 11/1969 | Willyoung . |
| 3,614,498 | 11/1970 | Bank et al. . |
| 4,177,398 | 12/1979 | Zagorodnaya et al. . |
| 4,275,324 | 6/1981 | Flick . |
| 4,316,114 | 2/1982 | Zagorodnaya et al. . |
| 4,369,389 | 1/1983 | Lambrecht ................... 310/214 |
| 4,430,589 | 2/1984 | Sakuyama et al. . |
| 4,439,701 | 3/1984 | Okamoto et al. . |
| 4,443,722 | 4/1984 | Hirao et al. . |
| 4,462,152 | 7/1984 | Okamoto et al. . |
| 4,482,829 | 11/1984 | Tardieu et al. . |
| 4,667,125 | 5/1987 | Kaminski et al. . |
| 4,843,271 | 6/1989 | Shah . |
| 4,876,469 | 10/1989 | Khtttoretsky ................ 310/214 |
| 5,065,059 | 11/1991 | Adams ......................... 310/261 |
| 5,113,114 | 5/1992 | Shih et al. . |
| 5,118,979 | 6/1992 | Shih et al. . |
| 5,122,698 | 6/1992 | Walker et al. . |

FOREIGN PATENT DOCUMENTS 0018941 1/1987 Japan ................. 310/214

OTHER PUBLICATIONS

Kokai No. 54-104503 (JP Appln. No. 53-10452, 2.3.1979) Hatsutori, pp. 9-13 (English Abstract only), Aug. 16, 1979.

*Primary Examiner*—R. Skudy
*Attorney, Agent, or Firm*—Nixon & Vanderhye

[57] ABSTRACT

In a dynamoelectric generator, a low-resistance electrical contact is provided by using a spring below the rotor slot wedges to bias the wedges against the overlapping retaining rings. This biased contact between the wedges and retaining rings forms a conductive current path for high-frequency eddy currents induced on the surface of the rotor and retaining rings at all operating speeds and at rotor standstill. In addition, the spring reduces gauling between the rotor key slots, wedges and retaining ring.

10 Claims, 2 Drawing Sheets

HARMONIC CURRENT PATH SPRING DEVICE BETWEEN RETAINING RING AND ROTOR WEDGE OF A DYNAMOELECTRIC GENERATOR

The invention that is the subject of this application was conceived and/or actually reduced to practice in the performance of a United States Navy contract.

FIELD OF INVENTION

This invention relates to an electrical contact for bridging high-frequency currents between the retaining rings and rotor of a dynamoelectric machine.

BACKGROUND AND SUMMARY OF THE INVENTION

This invention was made with United States Government support under a contract with the United States Navy. The federal government has certain rights in this invention.

Generator rotors have a large diameter cylindrical body from which extends at both ends a smaller diameter shaft. The rotor body has a series of longitudinal slots cut deep into its outer circumference. In these slots are inserted field windings that extend the length of the rotor body. There are rotor wedges in the slots that hold the windings in place against centrifugal forces exerted when the rotor rotates. These rotor wedges are above the windings in the rotor slot.

The end turn portions of the windings extend axially out beyond each end of the rotor body. These end turns electrically connect the longitudinal section of a winding in one slot with a similar winding section in another slot. As the rotor spins, the end turns are thrust radially outward by centrifugal force. This radial movement of the end turns is confined by cylindrical retaining rings that constrain the end turns.

The retaining rings slide over the ends of the, rotor body. They are usually attached to the ends the rotor body by shrink fitting. The rim of the retaining ring is shrink fitted tightly around a circumferential lip on the end of the rotor body. In addition, locking keys securely hold the retaining rings onto the rotor body to prevent axial movement of the rings. These keys fit in opposing grooves the retaining ring and in both the rotor teeth and wedges. Without these keys, thermal expansion of the field coils and the retaining rings may cause the retaining rings to slide axially off the rotor.

In some applications, high frequency currents exist on the surface of the rotor body and retaining rings. For example, when the generator is used in conjunction with a load commutated inverter (LCI), cycloconverter (CCV) or other non-linear load, eddy currents are induced on the surface of the rotor. These rotor eddy currents are the results of harmonics of the input and/or output currents of the LCI and CCV devices. These eddy currents have high frequencies and, thus, primarily reside at and near the surface of the rotor and retaining rings.

Losses due to eddy currents in the rotor result in undesirable $I^2R$ (Joulean) heating. Accordingly, low resistance harmonic current paths are needed to reduce eddy current losses and thus minimize heating. The rotor body and retaining rings, typically made of high strength steel alloys, are not themselves good electrical conductors. The relatively high electrical resistance of the retaining rings and rotor body to the eddy currents will cause high losses and heating. To avoid these losses, eddy current shields cover the outer surfaces of the rotor body and retaining rings to provide a low resistance electrical path for surface eddy currents. The shields reduce losses of eddy currents and prevent localized heating of the rotor body and retaining rings.

An eddy current shield is commonly a thin copper layer applied to the outer surfaces of the rotor body and retaining rings. The shield can be a jacket or a cladding. In the alternative, an eddy current shield for the rotor can be provided by specially configured wedges made of conductive chromium-copper or other alloys that have wings that overhang the rotor teeth adjacent the wedge.

While eddy current shields substantially reduce current losses, they do not reduce the magnitude of the eddy current. The current shields merely provide low resistance paths for the currents. Any interruption or point of high resistance in these current paths will cause additional loss and localized heating. The gap between the outer surface of the rotor body and the inner surface of the retaining ring is an interruption to eddy current and a long time aggravating source of eddy current losses. Accordingly, it is desirable to provide a reliable low resistance electrical connection between the rotor body and retaining rings.

In addition, galling occurs in prior art devices between the top surface of the wedges in the rotor slots and the retaining rings. Generally, galling occurs on the mating surfaces of the wedges, rotor slots and retaining rings. When frictional movement occurs between these mating parts, localized hot spots and even spot welding can arise. Especially at rotor standstill, prior art wedges can be subjected to extremely high pressure (for example, on the order of 5000 psi) if the shrink fitted retaining ring unintentionally pushes the wedge against the keyed surfaces of the rotor slot.

Because of the wedge crushing pressure that can result when a retaining ring shrinks onto a wedge, wedges have been typically designed so as to be at or below the surface of the rotor where the retaining ring covers the rotor. The compression of the wedge down into the slot is most severe when the rotor is stationary and centrifugal forces do not counteract the forces from the overlapping retaining ring. Since the wedges do not fit perfectly within their key slots in the rotor, the wedges can move slightly in the slot. Small gaps exist between the wedges and retaining ring. These gaps close as the wedges are forced radially outward by the centrifugal forces of rotor rotation. The opening and closing of the gaps between the wedge and retaining ring creates undesirable wedge chattering and causes galling between the wedges and both the rotor slots and retaining rings.

The current invention solves the wedge crushing pressure problem of retaining rings and provides a reliable electrical contact for eddy currents between the surface of the wedges and the retaining ring. The key slots in the rotor allow a top step on the wedge surface to extend radially beyond the rotor teeth surface where the retaining ring overlaps the wedge and rotor. The key slot also allows the wedges to move radially in the slot. The rotor wedges are biased radially outwardly by springs, e.g., arc leaf springs, immediately underneath the wedges. The springs flex under the pressure from the retaining ring and relieve the pressure from the retaining ring on the wedges, especially at rotor standstill when there are no counteracting centrifugal forces. In addition, these springs bias the wedges against the inner surface of the rim of the retaining ring to provide an electrical path for harmonic eddy currents.

It is an objective of this invention to reduce galling between rotor slots, wedges and retaining rings. Another object is to provide a reliable electrical junction between a rotor and a retaining ring for high-frequency eddy currents from standstill to operating speed. In addition, it is an object of this invention to provide such a junction by means of a spring mounted underneath rotor wedges to bias the wedges against the inner surface of the overlapping end of the retaining ring.

DETAILED DESCRIPTION OF THE DRAWINGS

Figure 1:
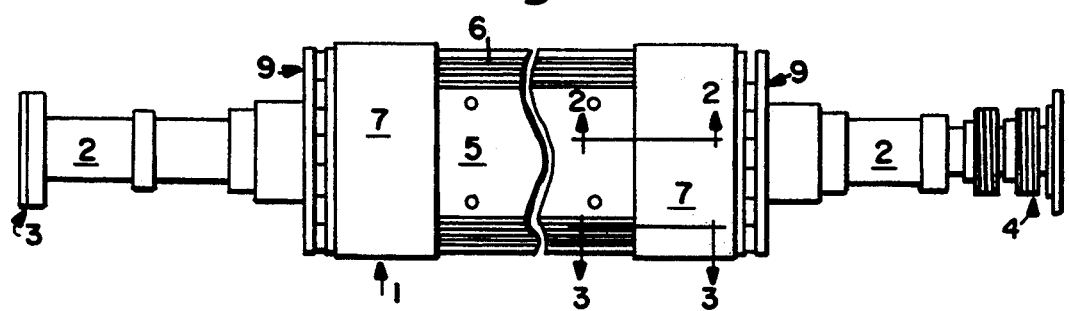
FIG. 1 is a perspective view of a generator rotor having coil windings and retaining rings.

FIG. 1 illustrates a rotor 1 for a generator (or motor). The rotor has a shaft 2 with a power turbine (or mechanical load) coupling 3 and supported by bearings that are not shown. The rotor shaft also has a collector ring 4 that provides an electrical junction for the rotor field winding.

Figure 2:
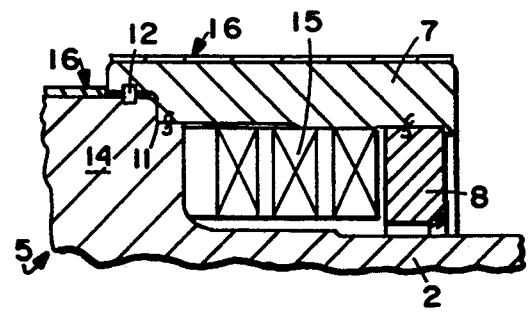
FIG. 2 is an axial cross section showing a conventional coupling between a retaining ring and a rotor body taken along line 2—2 of FIG. 1.

The rotor has a large diameter body 5 that holds the coil windings 6. This body has longitudinal slots in which the coil windings are mounted. The slots extend the length of the body. Annular retaining rings 7 cap both ends of the rotor body. The retaining rings are supported on one end by the and body and on the on the other end by a centering ring 8 (FIG. 2). Adjacent the retaining rings are fans 9 that cool the retaining rings and other rotor components.

Figure 3:
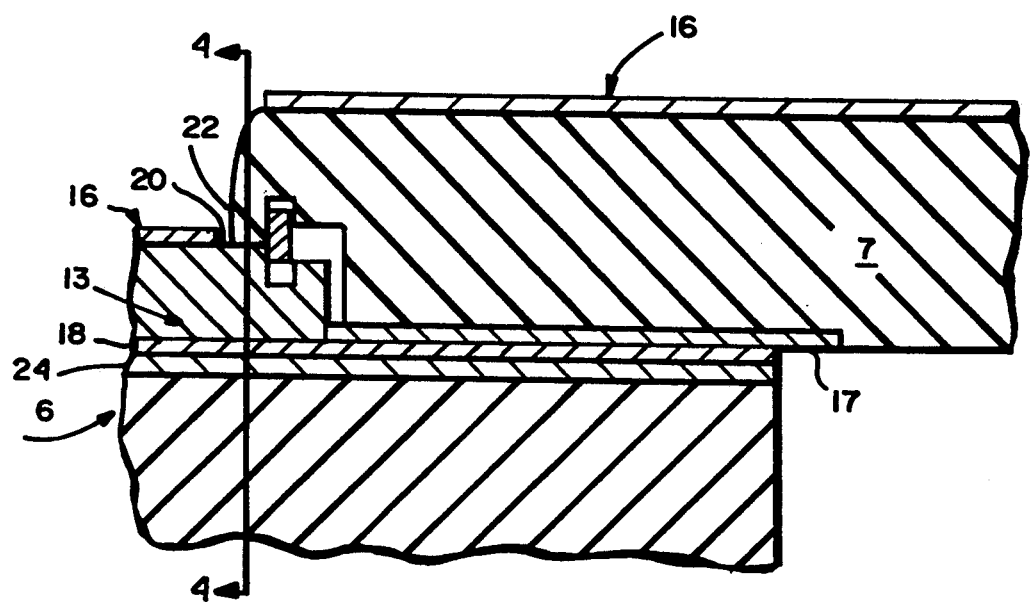
FIG. 3 is an enlarged view of an embodiment of the invention taken along an axial cross section taken across line 3—3 of FIG. 1.

As shown in FIGS. 2 and 3, the retaining rings 7 slide over the end of the rotor body 5. Each retaining ring is attached to a lip 11 on the end of the body by a shrink fit ($) process. The retaining rings are also shrink fit onto the centering rings 8 that center the retaining rings onto the shaft 2. In prior art devices, the retaining rings were not shrink fitted directly onto the wedges, because the wedges would have been crushed by a shrinking retaining ring.

To latch the retaining ring and wedge together, an annular locking ring 12 secures the retaining ring to the wedges and teeth of the rotor body. The locking ring engages grooves that extend circumferentially around the rotor and retaining rings. The groove in the rotor is cut in the teeth 14 of the rotor body and the wedges 13. The wedges 13 hold the coils in the slots and extend beyond the outside surface of the rotor body.

The end turns 15 on the coil windings are enclosed by the retaining rings 7. The end turns extend axially from the end of the rotor body. The end turns bend radially outward when subjected to the centrifugal forces arising from the rotating rotor. The retaining rings confine this radial movement of the end windings.

To conduct the high frequency eddy currents on the surface of the rotor and retaining rings, eddy current shields 16 cover the outer surfaces of the rotor body and retaining rings. In addition, finger amortisseur 17 and full-length slot amortisseur 18 provide a subsurface electrical connection between the wedge 13 and the retaining ring 7. The finger amortisseur fits into a recess in the inner surface of the retaining ring and electrically couples the full-length amortisseur to the inner surface of the retaining ring. The end of the finger amortisseur abuts against the end of wedge 13. The full-length amortisseur 18 extends the length of the rotor slot and is located below the slot wedge 13. The amortisseurs are copper inserts that extend in axial slots above the coil windings and underneath the wedge and the retaining ring.

The amortisseurs are too far below the outer surface of the wedge and rotor body to effectively conduct eddy currents. The current penetration depth (skin depth) of the eddy currents is inversely proportional to the square root of its frequency. Relatively high-frequency harmonic eddy currents do not penetrate the rotor to the depth of the bottom of the wedge and amortisseur. Accordingly, the amortisseurs are not an effective current path for high frequency eddy currents.

A low-resistance eddy current surface path is provided between a top step 20 of the wedge and front lip 22 of the retaining ring by a conductive arc leaf spring 24 underneath the wedge 13 and full-length amortisseur. The arc spring biases the wedge stop radially outward against the retaining ring, even when the rotor is at standstill. Because of the biasing force of the leaf spring, the outer surface of the step 20 is pressed tightly against the lip 22 of the retaining ring 7.

Currents in the eddy current shield 16 on the surface of the wedge pass efficiently between the wedge surface and retaining ring by virtue of the secure contact between the step 20 and the retaining ring 7. This direct surface junction provides a low-resistance current path that minimizes current losses and heating at the junction of the retaining rings and wedges.

Figure 4:
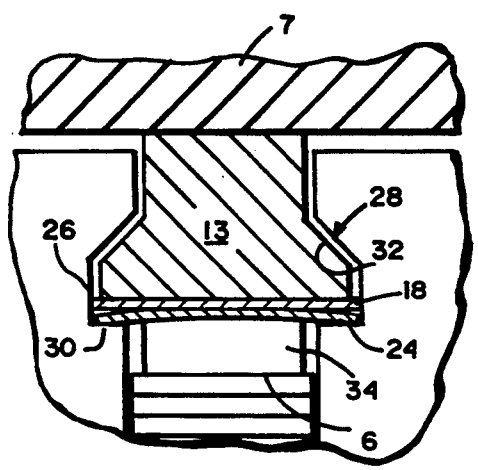
FIG. 4 is is a cross-sectional view taken along line 4—4 of FIG. 3.
Figure 5:
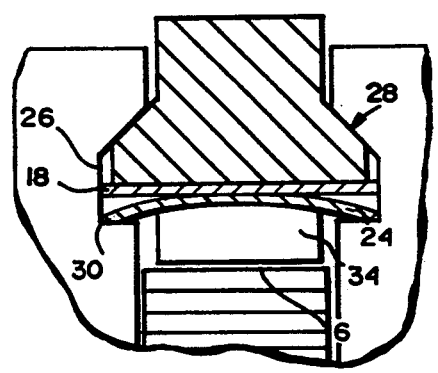
FIG. 5 is a cross-sectional view similar to that shown in FIG. 4, but without a retaining ring.

As shown in FIGS. 4 and 5, when the retaining rings 7 shrink fit onto the end of the rotor body 5, the ring pushes the wedge radially inward and compresses the leaf spring 24. The arc leaf spring, instead of the wedge, adsorbs the shrinkage of the retaining ring. FIG. 4 shows an installed retaining ring 7 fitted over a wedge 13 of a rotor body. The leaf spring 24 biases the wedge outward so that the surface of step 20 is pressed snugly against the inner surface of the retaining ring.

The wedge 13 fits within a key slot 26 at the radial outermost portion of the rotor slot. The key slot receiving the wedge is shaped to receive the wedge. The slot has a shoulder 28 and a ledge 30 for the wedge. The shoulder of the key slot acts as a stop to the matching wedge shoulder 32. Moreover, the key slot shoulder is shaped so as to allow the step 20 of the wedge to extend up from the rotor surface. The arc leaf spring 24 underneath the wedge 13 spans the width of the key slot and sits on the ledges 30 of the key slot. The leaf spring biases the wedge step radially outward and against the inner surface of the retaining ring.

The slot amortisseur 18 and/or finger amortisseur 17 are immediately above the arc leaf spring in the key slot 26. Below the leaf spring and within the slot, are a creepage block 34 and the coil windings 6.

Figure 6:
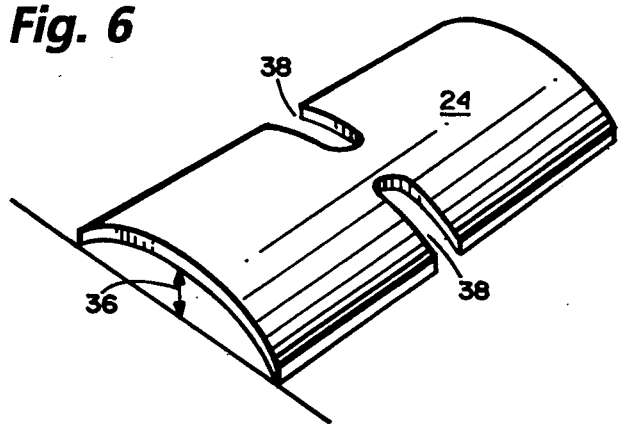
FIG. 6 is a perspective view of an arc spring from the described embodiment of the invention.

As shown in FIG. 6, the arc leaf spring is rectangular in shape and concave 36 in cross section. A bow in the spring biases the wedge towards the retaining ring. In addition, an opposing pair of slots 38 in the spring align with the edge of the wedge when the spring is positioned in the key slot. The slots allow the spring to flex slightly differently underneath the wedge that is underneath the finger amortisseur. Accordingly, the slots allow the spring to bias outward both the wedge and finger amortisseur against the retaining ring.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dynamoelectric machine comprising:
   a rotor body having a plurality of longitudinal slots in its outer surface;
   electrically-conductive windings having longitudinal sections located in said longitudinal slots;
   wedges in said longitudinal slots above the longitudinal sections of said windings and confining these longitudinal sections in said slots;
   a retaining ring attached to an end of said rotor body, said ring having an overlapping portion with an inner surface in contact with said wedges, and
   a spring underneath said wedges and biasing said wedges against the inner surface of the overlapping portion of said retaining ring.

2. A dynamoelectric machine as in claim 1 wherein said rotor body and said wedges comprise eddy current shields on their outer surfaces and said spring biases said wedges against said retaining ring forming a conductive electrical path for facilitating eddy currents from the wedges to the retaining ring at rotor standstill.

3. A dynamoelectric machine as in claim 1 wherein said wedges have a top step that is biased against the inner surface of said retaining ring by said spring.

4. A dynamoelectric machine as in claim 1 wherein said spring is an arc leaf spring.

5. A dynamoelectric machine as in claim 1 wherein said longitudinal slots include key slots having opposing ledges adapted to receive said spring and said spring is disposed on opposing ledges in key slots of the slots.

6. A dynamoelectric machine comprising:
   a rotor body having a plurality of longitudinal slots in its outer surface;
   electrically-conductive windings having longitudinal sections located in said longitudinal slots;
   wedges in said longitudinal slots above the longitudinal sections of said windings and confining these longitudinal sections in said slots;
   a retaining ring attached to an end of said rotor body, said ring having an overlapping portion with an inner surface in contact with said wedges, and
   a spring underneath said wedges and biasing said wedges against the inner surface of the overlapping portion of said retaining ring wherein said spring has at least one transverse slot aligned with an end of one of said wedges when said spring is positioned in one of said longitudinal slots.

7. A rotor for an electric machine comprising:
   a cylindrical rotor body having a longitudinal winding slot and a key slot disposed radially above the winding slot, said key slot having a pair of opposing shoulder surfaces facing generally inwardly of said rotor body, and said key slot opening through an outer surface of said rotor body;
   at least one wedge disposed in the key slot overlying said windings slot, the wedge having a pair of wedge shoulder surfaces adapted to abut against the shoulder surfaces of the key slot, and the wedge having a top step protruding radially through said opening in the key slot and outward from the outer surface of the rotor body, and
   a at least one elongated spring disposed radially underneath said wedge and biasing said wedge radially upward against an overlapping portion of a retaining ring attached to the rotor body.

8. A rotor for an electric machine comprising:
   a cylindrical rotor body having a longitudinal winding slot and a key slot disposed radially above the winding slot, said key slot having a pair of opposing shoulder surfaces facing generally inwardly of said rotor body and an opening between the surfaces and extending through an outer surface of said rotor body;
   at least one wedge disposed in the key slot having a pair of wedge shoulder surfaces adapted to abut against the shoulder surfaces of the key slot, and the wedge having a top step protruding radially through said opening in the key slot and outward from the outer surface of the rotor body, and
   at least one elongated spring disposed radially underneath said wedge and biasing said wedge radially topward against a retaining ring attached to the rotor body, wherein said spring has at least one transverse slot.

9. Apparatus according to claim 7 wherein the rotor has an axis, said spring is curved about an axis parallel to axis of said rotor and bows in a radial outward direction relative to the rotor.

10. Apparatus according to claim 7 including an elongated amortisseur disposed between said wedge and said spring and said spring biasing said amortisseur against an inner surface of said retaining ring.

* * * * *